Aug. 2, 1966 R. A. RILL ETAL 3,264,007
ROLLING FLUID TRANSPORTERS
Original Filed Sept. 25, 1958 3 Sheets-Sheet 1
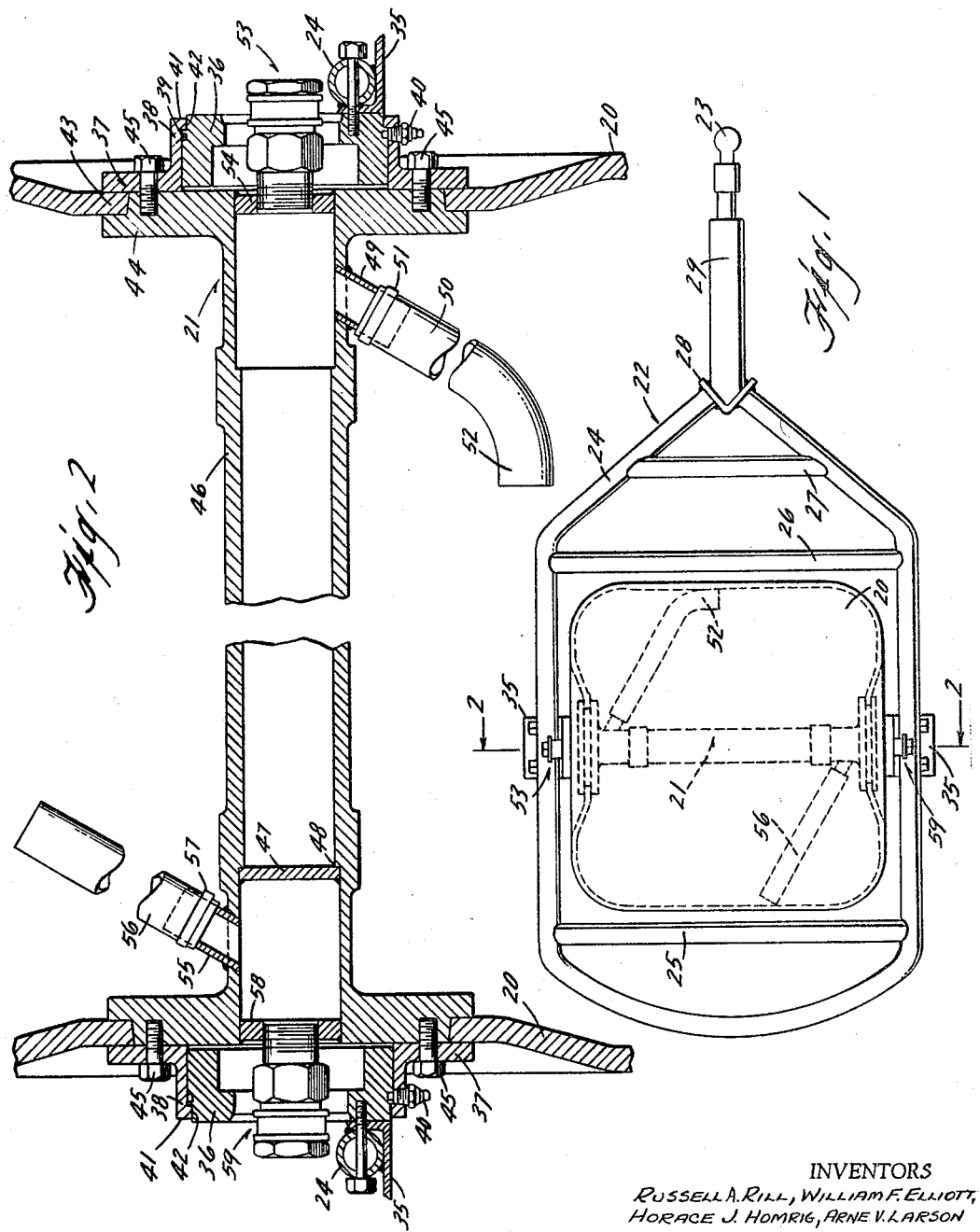
INVENTORS
RUSSELL A. RILL, WILLIAM F. ELLIOTT,
HORACE J. HOMRIG, ARNE V. LARSON
WALDEMAR J. MELDAHL, LEVERET C. RUSSLER
GEORGE DOUGLAS SIMONDS.
Wheeler, Wheeler & Wheeler
ATTORNEYS

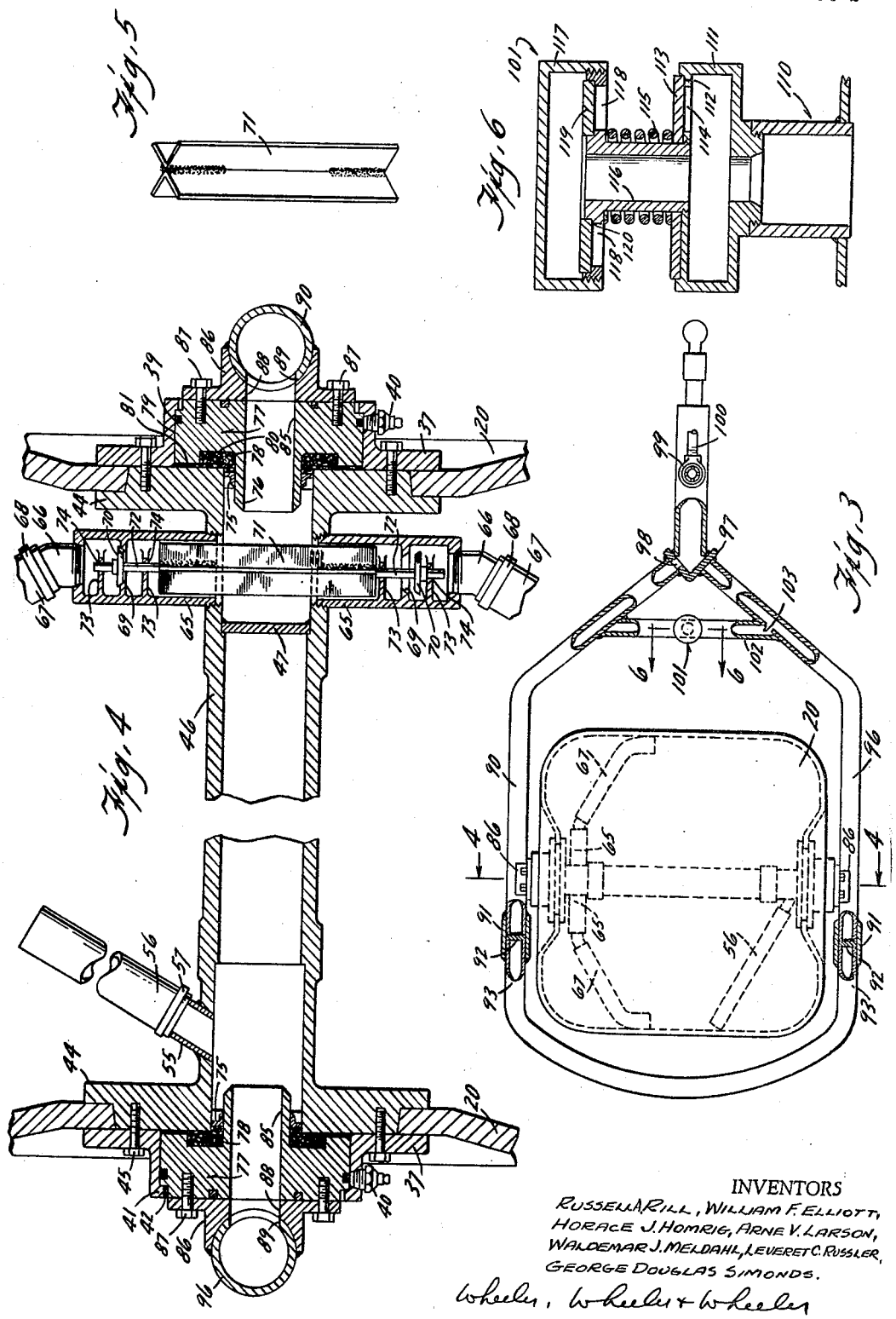

Aug. 2, 1966
R. A. RILL ETAL
3,264,007
ROLLING FLUID TRANSPORTERS
Original Filed Sept. 25, 1958
3 Sheets-Sheet 3
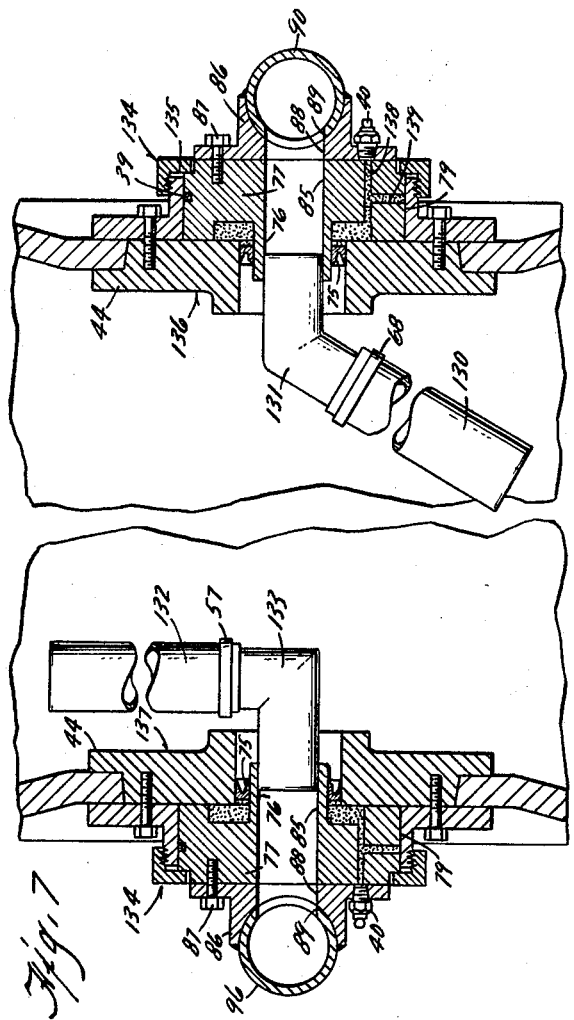
INVENTORS
RUSSELL A. RILL, WILLIAM F. ELLIOTT,
HORACE J. HOMRIG, ARNE V. LARSON,
WALDEMAR J. MELDAHL, LEVERET C. RUSSLER
GEORGE DOUGLAS SIMONDS
Wheeler, Wheeler + Wheeler
ATTORNEYS

3,264,007
ROLLING FLUID TRANSPORTERS
Russell A. Rill, William F. Elliott, Horace J. Homrig, Arne V. Larson, Waldemar J. Meldahl, Leveret C. Russler, and George Douglas Simonds, Clintonville, Wis., assignors to The Four Wheel Drive Auto Company, Clintonville, Wis., a corporation of Wisconsin
Original application Sept. 25, 1958, Ser. No. 763,371. Divided and this application May 17, 1962, Ser. No. 202,339
6 Claims. (Cl. 280—5)

This application is a division of applicants' co-pending application Serial No. 763,371, filed September 25, 1958, and which has since become abandoned.

This invention relates to improvements in rolling fluid transporters.

The invention comprises frames and wheels for use with pneumatic tires which are used as tanks in which to transport liquids, rather than as supporting members for a vehicle. More specifically, they relate to wheels for such a tire which are connected to a towing frame, in which the wheel, and in many instances the towing frame, serves as a conduit for liquids and gasses moving to and from the interior of the tire.

FIG. 1 is a top plan view of a rolling fluid tanker embodying our invention.

FIG. 2 is a cross-sectional view on line 2—2 of FIG. 1.

FIG. 3 is a top plan view of a modification of the device shown in FIGS. 1 and 2, with portions of the frame broken away to show the fluid passages.

FIG. 4 is a cross-sectional view on line 4—4 in FIG. 3.

FIG. 5 is a perspective view of the valve separator used in the embodiment of FIGS. 3 and 4.

FIG. 6 is a cross-sectional view of the vent valve used in the embodiment of FIGS. 3 and 4.

FIG. 7 is a cross-sectional view of a further modification of the embodiment of FIGS. 3 and 4.

FIGS. 1 and 2 show a rolling fluid tanker construction which is designed to be filled and emptied while the tanker is at rest. It consists of a pneumatic tire 20 mounted on a wheel hub 21, the wheel hub being drawn behind a vehicle by means of a towing frame 22 provided with a trailer hitch 23. The towing frame consists of an outer encircling member 24 which may be formed of pipe or tubing, and cross braces 25, 26 and 27 which may be similarly formed. The two ends of pipe 24 are joined at the forward end of the frame by welding them to angular member 24 at the outer faces of the angle. The short tow bar 29 is welded to the inner faces of the angle to serve as a mounting for the trailer hitch 23.

The wheel hub is mounted to frame member 24 by means of angle bracket 35, which in turn is secured to bearing member 36. Bearing member 36 is an annulus which has load bearing contact with tire bead clamp ring 37 at tubular bearing flange 38. An annular channel 39 in bearing ring 36 is supplied with lubricant through grease fitting 40 in flange 38 of clamp ring 37. An inwardly extending radial shoulder 41 engages a relieved portion 42 of bearing ring 36 to prevent axial movement of the wheel hub 21.

The board 43 of pneumatic tire 20 is clamped in the conventional manner between radial flange 44 of wheel hub 21 and tire bead clamp ring 37 by means of bolts 45, thus providing a fluid tight tank in which to transport liquids. Wheel hub 21 comprises an axial tube 46 extending between the radial tire mounting flanges 44, and integral therewith. The hub tube is divided into two fluid tight tubes by plug or partition 47 which is welded against a shoulder 48 near one end of axial tube 46. A T 49 is provided in hub tube 46 near one end, and a hose 50 is secured to the T by means of hose clamp 51. The T's may be inclined axially, as shown, so that if the tire collapses during emptying or for any other reason, the hose will bend over smoothly rather than kink, and the end will not be sealed by the tire. The hose extends radially to the inside surface of the tire 20, and may be slightly longer than the distance from T 49 to the periphery of the tire so that the end 52 is bent over to extend in an axial direction, thus the natural resilience of hose 50 will maintain it in a position contacting the periphery of the tire for maximum efficiency in draining a liquid from the tire. The liquid is supplied to and drained from the tire by means of conventional quick-disconnect fitting 53 which contains valve means to seal it when it is not in use. Fitting 53 is screwed into wheel hub closure 54 to provide access into the interior of axial tube 46.

At the other end of axial tube 46 is a similar structure consisting of T 55 at the opposite side of partition 47 from T 49, hose 56 and the hose clamp 57. Hose 56 extends to the periphery of tire 20 at a point diametrically opposite end 52 of hose 50, as shown in FIG. 1. This hose is used to vent the air within the tire during filling the tire with liquid, and to supply air while the tire is being emptied to prevent collapse of the tire due to lowered pressure or the weight of the framework. The air is vented or supplied through closure member 58 by means of conventional quick-disconnect coupling 59, which is provided with sealing means which are operative when it is not in use.

In operation, the vehicle is brought to rest in a position with hose 50 extending downwardly and hose 56 extending upwardly. It is helpful to provide a marking on the outside of the wheel hub to indicate the proper position, for instance the bolt 45 on the tire bead clamp ring which is uppermost may be painted a distinctive color. The operator then couples a liquid supply hose to quick-disconnect fitting 53, and couples an air hose to quick-disconnect fitting 59. The air hose fitting may be simply a short length of hose, or it may be connected to a source of air pressure while fluid is being emptied from the tire or to a pressure relief valve during filling of the tire, to control the pressure in the tire. In many instances it is desirable to keep a slight positive pressure within the tire, and in fact if the tire is only partially filled, a substantial volume of air under pressure may be trapped in the tire to aid in forcing out the liquid without a pump, simply by removing the air hose just before the desired liquid level is reached.

In the modification shown in FIGS. 3 through 6 the frame is provided with passages in communication with the axial hub tube 46 at each side of partition or plug 47, so that liquid may be transferred to and from the tire while the tanker is in motion, by means of connecting hoses from the vehicle to the frame of the tanker. In FIG. 4 it will be noted that the liquid supply provisions include two identical T's 65 at opposite sides of the hub tube 46, threaded connection to the tube. Each T 65 is provided at its radially outward end with an angle fitting 66, a hose 67 which extends to the periphery of the tire 20, as shown in FIG. 3, and a hose clamp 68 to secure the hose to the fitting. Inside the T is a frusto-conical valve seat 69 and a frusto-conical valve 70, the valve having its smallest diameter at the radially inward side to oppose fluid flow radially inward toward hub tube 46. A spreader 71, illustrated in perspective in FIG. 5, is provided between valve stems 72 which is of sufficient length to make it impossible for both valves to be closed at the same time. The valves are supported within T's 65 on valve stems 72, which slide freely in bores 74 at the center of spiders 73, one spider being radially inward and one radially outward from each valve 70. The purpose of the valve and valve spreader construction is to facilitate withdrawal of liquid while the vehicle is in motion, while preventing the air in the tire from entering the passages which vary the liquid as much as possible.

Without this construction, as the tire empties, the hose 67 which is uppermost will be above liquid level, and will draw air into the liquid passages. Gravity then closes the uppermost valve 70. There is also a danger that the flow of liquid through the lower valve, which has opened under the influence of gravity, will carry the valve with it and close it, particularly at a time when the T's 65 are nearly horizontal. Once closed, the valves may not reopen, because of the pressure differential created by the pump or air compressor.

With the spreader 71 in place this cannot occur, because the length of the spreader is such that only one valve 70 can close.

It is of course possible to empty the tanker without the spreaders 71, provided that vehicle speeds and pumping rates are kept low. This arrangement reduces the intake of air into the fluid lines to a minimum.

On the other side of partition 47 is a T 55, which carries a hose 56, and a hose clamp 57, as above described in connection with FIG. 2. It is not necessary to provide multiple air hoses because during the emptying operation the air can enter the tire through hose 56 whether it is above or below the fluid level, due to the pressure differential.

The hub of the wheel has been modified from the hub shown in FIG. 2 by the addition of a resilient annular seal 75, between a tubular axially extending flange 76 of the bearing block 77 and the interior surface of axial hub tube 46. This seal 75 is backed up at 78 with grease which has seeped over bearing surface 79 from lubricating grove 39, and has entered storage cavity 80 through space 81 between bearing member 77 and wheel flange 44, thus providing a tight rotating seal, particularly where water is the carried liquid, such as might be the case in fighting forest fires.

Bearing member 77 is provided with a bore 85 extending from tube 76 through the bearing block to frame supporting member 86, which is secured to bearing member 77, for instance by bolts 87. Frame supporting member 86 has a bore 88 in registry with bore 85, which connects with bore 85, which connects with bore 89, and thence to pipe 90 which comprises the side frame. The structure at the other end of the wheel is identical, and will not be separately described.

The frame back of the point where fluid enters side frame members 90 and 96 from frame support member 86 (see FIG. 3) consists of side frame member 90 (or 96) an outer sleeve 91 which is attached in fluid tight relation to the end of side frame and projects beyond it, fluid barrier 92 in fluid tight relation to sleeve 91 and the side frame pipe, and rear frame pipe 93, which is utilized to give the frame rigidity and to serve as a bumper. Thus no fluid can enter rear frame member 93. If desired, a trailer hitch may be mounted on rear frame 93 for towing additional tankers. The side frame pipes 90 and 96 extend forwardly to the forward margin of the tire, where they are bent to converge at angle member 97, to which they are welded or otherwise secured to make a fluid tight connection, sealing their ends. A passage 98 is bored in angle member 97 to permit the fluid from side frame member 90 to enter tow bar member 29, which is a pipe welded to the other side of angle 97 from said frames 90 and 96. A valve 99 is mounted on a T in tow bar 29 to regulate the passage of fluid to and from tire 20. Delivery hose 100 leads from the valve to pumping apparatus in the towing vehicle which is conventional and is not illustrated, for supplying and removing liquids from the tanker.

While the liquid is being removed from the tire 20, air enters the tire through vent valve 101 on cross member 102 of the frame. Cross member 102 is sealed, by welding or other means, at the end which is secured to side frame member 90, but is open to side frame member 96 through a bore 103 in the side frame. The air enters hub tube 46 from side frame 96, as previously described for the liquid side of the system, and enters the tire through air hose 56, as shown in FIG. 4. During filling of the tire with liquid opposite flow occurs, the liquid being supplied through tow bar 29 and side frame 90, and the air being expelled through side frame 96 and cross member 102.

The vent valve 101 which controls the entrance and exit of air from the tire is shown in FIG. 6. It consists of a body 110 provided with enlarged portion 111 which has a seat 112 for a flat annular valve disk 113. Disk 113 is seated over openings 114 from the interior of the valve. A spring 115 biases disk 113 toward seat 112, so that it stays seated until the air pressure in the valve exceeds the pressure of spring 113, at which time the disk 113 will be forced off its seat 112 and will permit air to escape until the pressure in the tire is lowered sufficiently so that it is unable to overcome the bias of spring 115. This provides for air which is forced out of the tire as it is filled, and for expansion of the contents of the tire. The vent valve is further provided with a hollow stem portion 116 opening upwardly from enlarged portion 111 to enlarged portion 117. Portion 117 is provided with downwardly opening holes 118, which are covered by a flat annular valve member 119 resting on valve seat 120. Valve member 119 is inside of enlarged portion 117 of the valve, and is not under any bias other than that of gravity. When the contents of the tire contract, or when a drop in pressure is induced by pumping out the contents of a tire, valve 119 rises from its seat to admit air, thus maintaining the pressure inside the tire at not less than atmospheric pressure.

Thus this embodiment of the invention provides a construction in which liquid may be drained from the tire while the tanker is in motion, the fluid and the air to replace it being carried by the frame of the tanker, the rotating seal being backed by grease which is supplied by ordinary lubrication, and effective valving provisions being made inside of the wheel to prevent the entrance of an undue amount of air into the liquid passages.

FIG. 7 illustrates a further modification of our invention, in which the liquid withdrawal arrangements are simplified by the omission of hub tube 46. In this embodiment the fluid hose 130 and hose clamp 68 are mounted on an elbow 131, which is secured to tubular flange 76 of bearing member 77. Since bearing member 77 is stationary with respect to frame supporting member 86, liquid hose 130 is always directed radially downwardly, and its free end will always be below the level of the liquid in the tire until the tire is empty. It will be noted that the hose extends axially as well as radially because the angle of the tee 131 is over 90 degrees, so that upon partial deflation of the tire the hose is easily deflected, and the end is not sealed by the tire.

The air fittings are similarly modified in that air hose 132 and hose clamp 57 are installed on an elbow 133 which is inserted in annular flange 76 of left hand bearing member 77, thus insuring that the air hose will always be upwardly directed.

The tire bead clamp ring has been modified from the arrangements shown in previous embodiments of the invention by the provision of a separate end-thrust receiving bearing clamp ring 134, having a radial face 135 in contact with the radial face of bearing member 77 to axially position the wheel with respect to the bearing member. Since there is no hub tube, right hand portion 136 of the wheel would be free to move axially with respect to lefthand portion 137 of the wheel if it were not for the restraint imposed by bearing clamp rings 134, which have threaded engagement with the tire bead clamp ring to permit the bearing to be drawn up until it has only sufficient play to turn freely. Because of the location of ring 134, it interferes with the lubrication provisions shown in FIG. 4, so grease fitting 40 is moved to the side of frame support member 86, and a drilled passage 138 carries lubricant to a space behind seal 75 and into branch lubricant passage 139 which supplies lubricant to annular lubricant channel 39 and to main bearing surface 79. Because the tightness of the bearing may be adjusted independently of the tire bead clamp ring, this modification makes it easier to adjust all parts to proper operating tightness.

We claim:

1. A rolling fluid transporter comprising in combination, a pneumatic tire having tire beads, a wheel having a tire bead engaging flange, and an annular tire bead clamp ring having a radial portion bolted to said wheel to clampingly engage said tire bead to seal it against said wheel flange, a bearing for said wheel, a towing frame fixedly secured to said bearing, said tire bead clamp ring having an axially extending tube integral with the radially innermost portion of said ring, said tube being in bearing engagement with said bearing member, and a radially inwardly directed shoulder at the outer end of said tube to secure said wheel against axial movement with respect to said bearing member, said wheel further comprising an axially extending hub tube, a plug between the ends of said hub tube preventing communication between said ends, a T at each end of said hub tube extending radially outwardly therefrom, at least one said T being axially inclined toward the center of said hub tube, and a flexible hose secured to each said T and extending to a point adjacent the periphery of said tire, being bent at their outer ends to extend approximately axially, said outer end being in contact with the periphery of the tire.

2. The device of claim 1 in which one end of said hub tube is provided with at least two said T's which are equally angularly spaced on said hub tube, each said T being provided with one said hose extending to the periphery of the tire, said bearing member being provided with a passage in communication with the interior of said hub tube, and in which said frame comprises a tubular side member in communication with said passage in said bearing member, whereby fluids may be supplied to or removed from the interior of said tire while said transporter is in motion.

3. The device of claim 2 in which the T's at the end of the hub tube which is provided with more than one T are provided with check valves arranged to close when said T's are above the axis of the hub tube.

4. The device of claim 3 further comprising means for preventing closure of both check valves at the same time.

5. The device of claim 4 in which each said check valve comprises a frusto-conical seat in said T, a frusto-conical valve member engagable with said seat, a radially directed valve stem upon which said frusto-conical valve member is mounted, valve stem guides within said T to guide said valve stem for free oscillation in a radial direction, said means for preventing both valves from closing simultaneously comprising a valve spreader member engaging the radially inward ends of the said valve stems.

6. A rolling fluid transporter comprising in combination, a pneumatic tire having tire beads, a wheel having a tire bead engaging flange, and an annular tire bead clamp ring having a radial portion bolted to said wheel to clampingly engage said tire bead to seal it against said wheel flange, a bearing for said wheel, a towing frame fixedly secured to said bearing, said tire bead clamp ring having an axially extending tube integral with the radially innermost portion of said ring, said tube being in bearing engagement with said bearing member, and a radially inwardly directed shoulder at the outer end of said tube to secure said wheel against axial movement with respect to said bearing member, said wheel further comprising an axially extending hub tube, a plug between the ends of said hub tube preventing communication between said ends, a T at each end of said hub tube extending radially outwardly therefrom, at least one said T being axially inclined toward the center of said hub tube, and a flexible hose secured to each said T and extending to a point adjacent the periphery of said tire, said bearing member being provided with an axially inwardly directed integral tube extending into said hub tube, a resilient seal between said bearing tube and said hub tube, means for supplying grease to the area of contact between said tire bead clamp ring and said bearing member, and grease passages from said area of contact to the space between said hub tube and said bearing tube outwardly adjacent to said resilient seal.

References Cited by the Examiner

UNITED STATES PATENTS

| 498,696 | 5/1893 | Provine | 280—5 X |
|---|---|---|---|
| 2,548,190 | 4/1951 | Arpin | 280—5 |
| 2,824,592 | 2/1958 | Neisler et al. | |
| 2,974,970 | 3/1961 | Tuttle et al. | 280—5 |
| 3,059,942 | 10/1962 | Kirk et al. | 280—5 |

FOREIGN PATENTS

| 101,076 | 5/1937 | Australia. |
|---|---|---|
| 573,726 | 7/1942 | Great Britain. |
| 376,958 | 12/1939 | Italy. |

A. HARRY LEVY, *Primary Examiner.*